(No Model.)
D. A. LOWTHIME.
CASE FOR OPERA GLASSES.
No. 463,634. Patented Nov. 24, 1891.
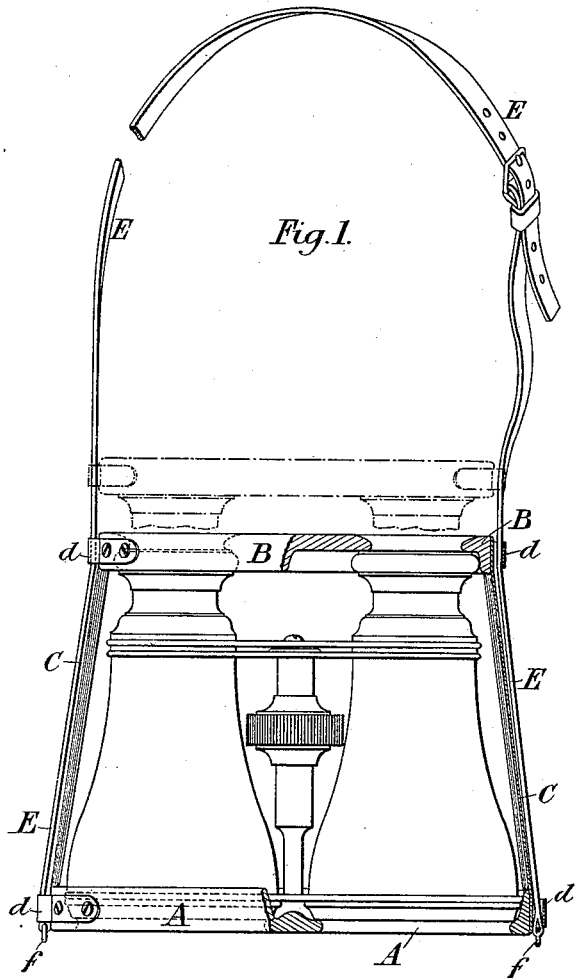
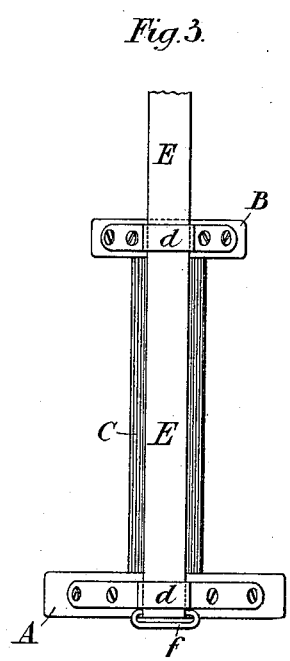
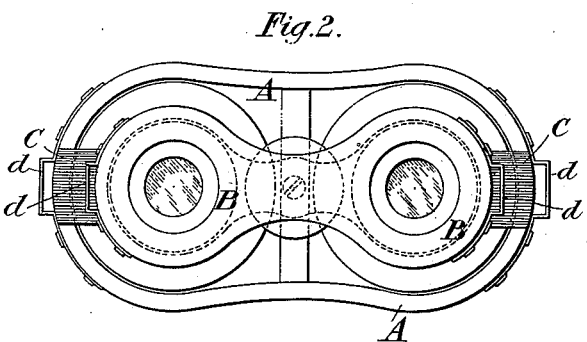
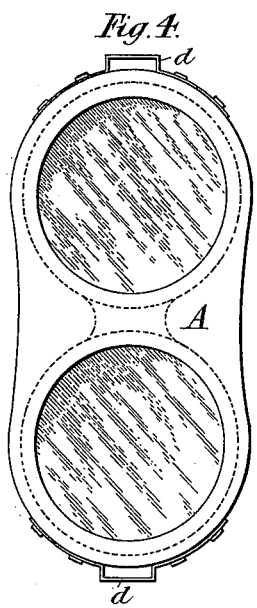
Witnesses:
Carleton E. Snell
Walter A. Browne
Inventor
David Abraham Lowthime,
by Arthur D. Browne
his attorney.

UNITED STATES PATENT OFFICE.

DAVID ABRAHAM LOWTHIME, OF LONDON, ENGLAND.

CASE FOR OPERA-GLASSES.

SPECIFICATION forming part of Letters Patent No. 463,634, dated November 24, 1891.

Application filed March 20, 1891. Serial No. 385,807. (No model.)

*To all whom it may concern:*

Be it known that I, DAVID ABRAHAM LOWTHIME, fancy goods manufacturer, a subject of the Queen of Great Britain, residing at 17 Lamb's Conduit Street, in the city of London and Kingdom of Great Britain, have invented certain new and useful Improvements in Cases for Opera-Glasses, Binocular Telescopes, and the Like, of which the following is a specification.

My invention relates to the construction of cases, such as are usually worn suspended by a strap, for carrying opera-glasses, binocular telescopes, and the like, and is intended to enable the wearer to use his glass without its being absolutely necessary for him to take it out of its sling-case. It often happens in actual use that the wearer of such an instrument wants it suddenly, and if it is in a sling-case of the ordinary construction it is probable that before it can be extracted from its case the object or circumstance which attracted attention may have disappeared or ceased, and the opportunity of observing it may have passed; and, further, when the glass has been used it has to be returned to its case and properly secured, otherwise there is risk of losing it, and thus when it is required at frequent intervals the trouble of getting it out and returning it is so great that the wearer frequently prefers either to hold it in his hand for a considerable period of time or to trust to his unaided vision. Now according to my invention the instrument is slung in a case so constructed that it may be used without being removed therefrom, and so that it may be raised to the eye and used in its case without any delay or trouble. I so construct my improved cases that the lenses are not covered, the two ends of the case being either open and retaining the instrument by a narrow rim or pierced with suitable openings in front of the lenses, as shown in the accompanying drawings. The two ends or top and bottom of the case I connect together with an elastic fabric or material in such manner that the instrument may be focused by turning the milled head in the ordinary manner without being taken from its case, the elastic material yielding sufficiently to allow the necessary extension. To remove the instrument from its case the upper part of the case is lifted off and to one side, (stretching the elastic sides,) and the instrument can then be disengaged. An instrument thus slung in one of my improved cases can be applied to the eye at any moment and focused and dropped again without any trouble and without its being necessary to take the eye off the object of interest.

In the accompanying drawings, Figure 1 is an elevation, partly in section, of the case with an opera-glass or binocular telescope in it. The dotted lines show the position of the eye-piece, &c., when focused for use on a near object. Fig. 2 is a plan of the same, but without the suspending-strap. Fig. 3 is an end elevation of the case without the instrument, and Fig. 4 is an elevation of the object-glass end of the case.

A is the lower or object-glass end of the case, and is shown more particularly in Figs. 1 and 4. In the former it is shown partly in section.

B is the upper or eye-piece end of the case, (shown more particularly in Figs. 1 and 2 in the former,) partly in section.

C C are elastic side pieces, which serve to connect the parts A and B and draw them toward each other, so as to grasp and retain the instrument.

$d\ d$ are eyes through which the strap is passed.

E is a portion of the strap or straps by which the case is suspended, and $f\ f$ are flattened rings sewed into the straps and serving to prevent their drawing through the eyes $d$.

Having now fully described my invention, what I claim, and desire to secure by Letters Patent, is—

1. A sling-case for binocular instruments, consisting of two frames or end pieces A B, and elastic connections C C, connecting the end of one of said end pieces to the ends of the other of said end pieces, each of said end pieces having openings opposite the lenses of a binocular instrument held between said end pieces, substantially as set forth.

2. A sling-case for binocular instruments, consisting of two frames or end pieces A B, each of said end pieces having openings opposite the lenses of a binocular instrument held between them, elastic connections C C, connecting the ends of one of said end pieces with the ends of the other of said end pieces, and holding-straps E E of inelastic material, connected with the bottom one of said end pieces and passing through eyes $d\ d$, carried by the upper of said end pieces, substantially as set forth.

DAVID ABRAHAM LOWTHIME.

Witnesses:
NEWNHAM BROWNE,
*Patent Agent, 73 Cheapside, London.*
WALTER J. SKERTEN,
17 *Gracechurch Street, London, Notary's Clerk.*